(12) United States Patent
Srinivasan et al.

(10) Patent No.: US 9,055,005 B2
(45) Date of Patent: Jun. 9, 2015

(54) VIRTUAL-PORT NETWORK SWITCH FABRIC

(71) Applicant: Oracle International Corporation, Redwood City, CA (US)

(72) Inventors: Arvind Srinivasan, San Jose, CA (US); Shimon Muller, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 193 days.

(21) Appl. No.: 13/909,444

(22) Filed: Jun. 4, 2013

(65) Prior Publication Data

US 2014/0269743 A1    Sep. 18, 2014

Related U.S. Application Data

(60) Provisional application No. 61/793,453, filed on Mar. 15, 2013.

(51) Int. Cl.
*H04L 12/931*    (2013.01)

(52) U.S. Cl.
CPC ..................................... *H04L 49/70* (2013.01)

(58) Field of Classification Search
None
See application file for complete search history.

(56) References Cited

U.S. PATENT DOCUMENTS

| | | | |
|---|---|---|---|
| 2008/0049778 A1* | 2/2008 | Yano et al. | 370/422 |
| 2012/0317311 A1* | 12/2012 | Arakawa et al. | 710/3 |
| 2013/0100798 A1* | 4/2013 | Zeng et al. | 370/218 |
| 2014/0269743 A1* | 9/2014 | Srinivasan et al. | 370/401 |

* cited by examiner

*Primary Examiner* — Benjamin H Elliott, IV
(74) *Attorney, Agent, or Firm* — Park, Vaughan, Fleming & Dowler LLP; Steven E. Stupp

(57) ABSTRACT

An input/output (I/O) switch fabric includes first physical ports that convey multiple network flows. Moreover, classifiers in the I/O switch fabric separate packets for network flows associated with different types of service. Then, the I/O switch fabric conveys the packets to different virtual switch ports without interference between the separated packets associated with different network flows. Furthermore, second physical ports in the I/O switch fabric output the packets, where a given second physical port outputs packets for at least some of the network flows associated with different types of service. In this way, the given second physical port can output packets having: the same source and destination; different sources and the same destination; or the same source and different destinations.

20 Claims, 5 Drawing Sheets

VIRTUAL-PORT NETWORK SWITCH FABRIC

CROSS REFERENCE TO RELATED APPLICATION

This application claims priority under 35 U.S.C. §119(e) to U.S. Provisional Application Ser. No. 61/793,453, entitled "Virtual-Port Network Switch Fabric," by Arvind Srinivasan and Shimon Muller, filed on Mar. 15, 2013, the contents of which is herein incorporated by reference.

BACKGROUND

1. Field

The disclosed embodiments generally relate to a packet-processing technique for communications networks. More specifically, the disclosed embodiments relate to the design of a packet-processing network which is based on a virtual-port network switch fabric.

2. Related Art

In high-performance systems, a network or input/output (I/O) switch fabric typically plays an important role in traffic movement between servers. For example, with servers running multiple virtual machines (VMs) and many virtualized applications, network-packet streams coming out of a server often include an aggregation of different services that are needed by each of the VMs and their applications.

Within this aggregated network pipe, individual network-packet streams (representing different applications) tend to have different requirements. Moreover, at times these requirements may be in conflict with each other. For example, one network-packet stream may be latency-sensitive, while another network-packet stream may be latency-tolerant, but may need more services, such as routing or deeper packet inspection. Furthermore, some applications may require a low-latency response for communication, while other applications may be throughput-sensitive, but may be latency-tolerant. Consequently, it can be difficult to maintain the quality of service at the application level throughout the network switch fabric when multiple applications communicate across servers using existing network switch fabrics.

Hence, what is needed is a network switch fabric that facilitates communication of network-packet streams without the problems described above.

SUMMARY

One embodiment of the present disclosure provides an input/output (I/O) switch fabric that includes first physical ports, where a given first physical port conveys multiple network flows. During operation, a classifier in the I/O switch fabric, which is coupled to the first physical ports, separates packets for network flows associated with different types of service. Furthermore, pipelines in the I/O switch fabric, which are coupled to the classifier and virtual switch ports, convey the packets to different virtual switch ports without interference between the separated packets associated with different network flows. Additionally, second physical ports in the I/O switch fabric are coupled to the virtual switch ports, where a given second physical port concurrently outputs packets for at least some of the network flows associated with different types of service.

Note that the I/O switch fabric may maintain network-flow affinity of the packets.

In some embodiments, the packets provided by the given second physical port have: the same source and destination; different sources and the same destination; or the same source and different destinations.

Moreover, at least one of the network flows may be associated with a switching service and/or a routing service. However, the network flows may be associated with other types of service.

In some embodiments, the classifier includes: a first classification engine that separates the packets based on at least one of physical-layer information and link-layer information included in the packets; and second classification engines, coupled to the first classification engine, that further separate the packets into the pipelines based on layer information in the packets that is other than the physical-layer information and the link-layer information. Note that the first classification engine and the second classification engines may maintain relative ordering of the packets in network sub-flows while allowing changes in the relative ordering of the packets among different network flows.

Another embodiment provides a system that includes the I/O switch fabric.

Another embodiment provides a method for providing packets. During the method, the I/O switch fabric receives the packets on the first physical ports, where the given first physical port conveys the multiple network flows. Then, the packets are separated for the network flows associated with the different types of service. Moreover, the packets are conveyed to the different virtual switch ports without interference between the separated packets associated with the different network flows. Next, the packets are output on the second physical ports, where the given second physical port concurrently outputs the packets for at least some of the network flows associated with the different types of service.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an input/output (I/O) switch fabric, a system that includes the I/O switch fabric, and a method for providing packets are described. This I/O switch fabric includes first physical ports that convey multiple network flows or packet streams. Moreover, classifiers in the I/O switch fabric separate packets for network flows associated with different types of service. Then, the I/O switch fabric conveys the packets to different virtual switch ports without interference between the separated packets associated with different network flows. Furthermore, second physical ports in the I/O switch fabric output the packets, where a given second physical port outputs packets for at least some of the network flows associated with different types of service. In this way, the given second physical port can output packets having: the same source and destination; different sources and the same destination; or the same source and different destinations.

By separating the packets and conveying them without interference, the communication technique allows the requirements associated with different network flows to be met without conflicts. Therefore, the communication technique may help maintain the quality of service at the application level throughout the I/O switch fabric while multiple applications communicate across servers in a network.

Figure 1:
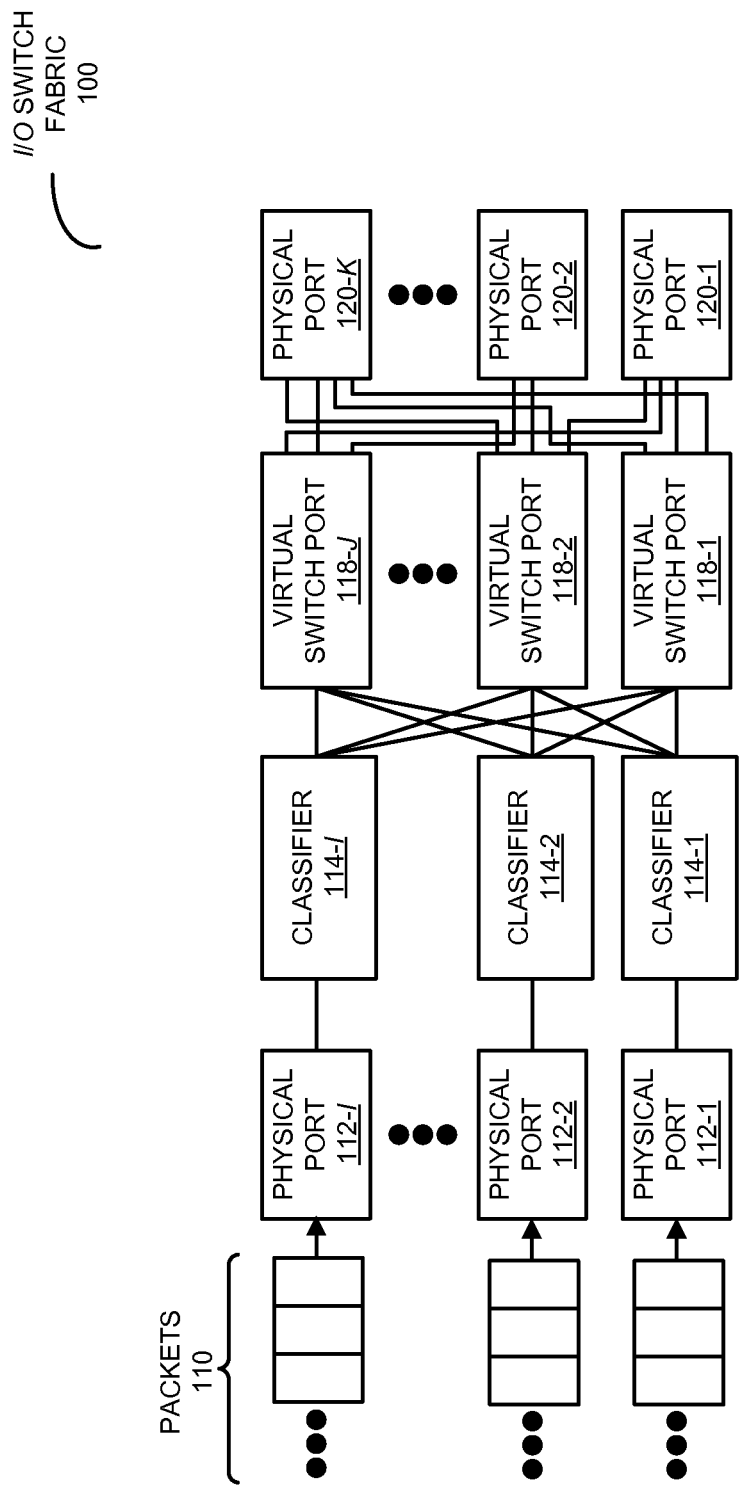
FIG. 1 is a block diagram illustrating an input/output (I/O) switch fabric in accordance with an embodiment of the present disclosure.

We now describe embodiments of the I/O switch fabric and the system. FIG. 1 presents a block diagram illustrating I/O switch fabric 100. This I/O switch fabric includes physical ports 112, where a given one of physical ports 112 (such as physical port 112-1) conveys multiple network flows. Moreover, classifiers 114 in I/O switch fabric 100, which are coupled to physical ports 112, separate packets 110 for network flows associated with different types of service. Note that classifiers 114 may be implemented using hardware and/or software.

Furthermore, I/O switch fabric 100 conveys packets 110 to different virtual switch ports 118 without interference between the separated packets associated with different network flows. While each one of virtual switch ports 118 can support different types of service, a given one of virtual switch ports 118 (such as virtual switch port 118-1) supports a given service. This capability facilitates the splitting and the combination of the network flows. Additionally, physical ports 120 in I/O switch fabric 100 are coupled to each of virtual switch ports 118, where a given one of physical ports 120 (such as physical port 120-1) concurrently outputs packets for at least some of the network flows associated with different types of service.

Note that I/O switch fabric 100 maintains network-flow affinity of the packets. In particular, virtual switch ports 118 provide a way to separate and combine flows, and to share resources without compromising service levels associated with the network flows.

As described further below with reference to FIG. 3, in some embodiments the packets provided by the given one of physical ports 120 have: the same source and destination; different sources and the same destination; or the same source and different destinations. Moreover, at least one of the network flows may be associated with a switching service and/or a routing service. However, the network flows may be associated with other types of service.

While a wide variety of classifiers can be used, in an exemplary embodiment classifiers 114 are hierarchical classifiers. This is further illustrated in FIG. 2, which presents a block diagram of hierarchical classifier 200. This hierarchical classifier includes a classification engine (C.E.) 210 that separates packets 110 based on at least one of physical-layer information and link-layer information in the OSI model, which are included in packets 110 (such as in headers). For example, the physical-layer information may include the port of arrival, and
the link-layer information may include the Media Access Control address and the Virtual LAN tag. Note that packets 110 may be associated with one or more: network flows, policies (e.g., for a switch) and/or services. In the present discussion, network flows are used as an illustrative example.

Moreover, hierarchical classifier 200 includes subsequent classification engines 214, coupled to classification engine 210, which further separate packets 110 into multiple parallel pipelines 216 (which are coupled to virtual switch ports 118 in FIG. 1) based on layer information in the OSI model, which is included in packets 110, and which is other than the physical-layer information and the link-layer information. Note that classification engine 210 and classification engines 214 may maintain a relative ordering of packets 110 in network sub-flows while allowing changes in the relative ordering of packets 110 among different network flows.

For example, second classification engines 214 may further separate packets 110 based on network-layer information in the OSI model, which is included in the packets. In particular, the network-layer information may include packet forwarding protocols and techniques, such as switching or routing.

Figure 2:
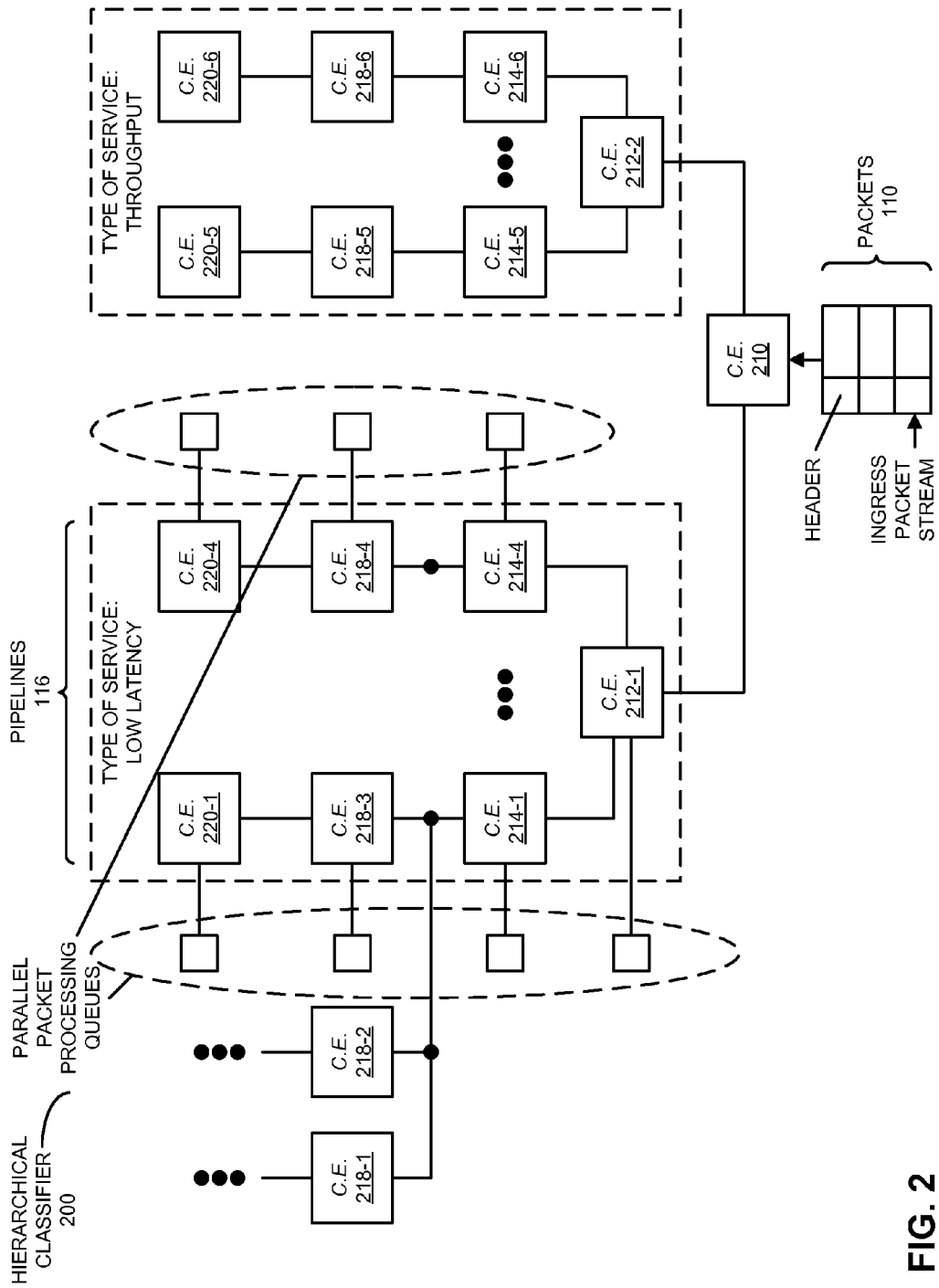
FIG. 2 is a block diagram illustrating a hierarchical classifier in the I/O switch fabric of FIG. 1 in accordance with an embodiment of the present disclosure.

In some embodiments, the hierarchy includes one or more additional stages. In particular, hierarchical classifier 200 may include classification engines 218, coupled to at least one of classification engines 214 and at least some of parallel pipelines 216, which further separate packets 110 based on transport-layer information in the OSI model, which is included in packets 110. For example, the transport-layer information may include end-to-end communication services for applications in a layered architecture of network components and protocols, such as: connection-oriented data stream support (such as the transmission control protocol), reliability, flow control, and multiplexing. As shown in FIG. 2, hierarchical classifier 200 may include multiple recursive classification stages, such as classification engines 218-1 and 218-2, which branch off after classification engine 214-1. Additionally, hierarchical classifier 200 may include classification engines 220, coupled to at least one of classification engines 218 and at least some of parallel pipelines 216, which further separate packets 110 based on application-layer information in the OSI model, which is included in packets 110. For example, the application-layer information may include communication protocols and process-to-process communications across an Internet Protocol. Thus, the application-layer information may include applications or services associated with packets 110.

Classification engines 212, 214, 218 and 220 in hierarchical classifier 200 may each optionally output packets 110 to one or more pipelines to processing queues or nodes. (For clarity in FIG. 2, the processing queues are only shown for the classification engines in the low-latency type of service. While these processing queues are not shown in the throughput type of service, they are also included.)

By implementing classification of packets 110 in a cascaded or hierarchical manner, in which the depth of the classification is, in general, increased in subsequent stages, the classification can be implemented in an efficient manner that readily scales at higher data rates. (Note, however, that the classification at any given stage in the hierarchy can be scaled, i.e., the classification may use information in packets 110 that is readily accessed or that may require more processing.) Moreover, the number of classification engines in hierarchical classifier 200 may increase as packets 110 progress through the hierarchy. However, while the classification technique is illustrated in FIG. 2 with a tree-like structure having branches, note that a given classification engine in a particular stage (such as classification engine 214-1) may separate a given packet in: a shorter time than classification engine 210; the same amount of time as classification engine 210; or a longer time than classification engine 210. More generally, hierarchical classifier 200 may maintain an order of different classes of service so that the different classes of service avoid impacting each other during recursive classification. Furthermore, packets 110 may have different sizes for different classes of service and/or the network sub-flows may belong to the same class of service. The different classes of service may be indicated by one or more packet headers in the operating-system stack. The multiple recursive classification engines in the branches of hierarchical classifier 200 may allow these different classes of service to be processed using different pipelines.

In an exemplary embodiment, classification engine 210 is a shallow classification stage that is a precursor to the main classification stage in classification engines 212. For example, based on the type of service needed (e.g., low latency) for a given packet, classification engine 210 may choose or select the appropriate next classification engine (such as one of classification engines 214), and then may provide the given packet to the selected classification engine. This classification technique parallelizes the classification stages, with each subsequent stage capable of further fine-grained or deeper parallel processing.

We now describe exemplary embodiments of the I/O switch fabric. In a typical system, a physical port tends to provide only one type of service. Multiple levels of service typically do not simultaneously exist with granular control of the service level, such as for throughput and latency management. The I/O switch fabric may address these traffic/application requirements by providing a virtualized switch-port service at the level of a physical port of a network switch (i.e., at the level of the I/O switch fabric). As described previously with reference to FIG. 2, this may be achieved by using hierarchical classifiers that divide the traffic into different virtual switch ports. Using this classification approach, different service resources and levels are attached to various virtual switch-port numbers. Moreover, the I/O switch fabric can be configured so that traffic flows corresponding to different service levels can bypass each other (i.e., the relative ordering can be changed).

In the I/O switch fabric, each physical port may have multiple virtual service levels associated with corresponding virtual switch ports. This capability may facilitate services, such as: a low-latency switching service; a network-level routing service (in an Open Systems Interconnection or OSI model); a network-layer/transport-layer offload service (in the OSI model); and an application layer service (in the OS/model).

In particular, the low-latency switching service may provide low-latency cut-through processing. For example, in the context of an InfiniBand network, this may be based on a destination local identifier (DLID) lookup. The DLID lookup may result in a virtual switch-port number which maps to a physical destination port where a given packet is forwarded. Moreover, because there can be multiple hops, the network-level routing service may tend to be latency-tolerant. In the context of the InfiniBand network, packets have to be routed and appropriate link layer addresses (in the OS/model) have to be replaced. This service may be identified by a DLID (in the link-layer information) and a network-layer lookup. These lookups may result in a virtual (destination) switch port that has the routing service enabled.

Note that in a complex data-center configuration, there may be multiple virtual machines (VMs) on different subnets on the same server. This is illustrated in FIG. 3, which presents a block diagram of a system 300 that includes I/O switch fabric 310 (which is an embodiment of I/O switch fabric 100 in FIG. 1). In FIG. 3, VM1 and VM2 may be on the same physical server, and VM0 and VM1 may be on the same subnet, but a different one than VM2. In this case, communication between VM0 and VM1 may follow a low-latency switching path, while communication between VM0 and VM2 may follow a routing-service path. Note that, in both of these cases, the same physical port is used.

In the network-layer/transport-layer offload service, the network flows may be latency- and throughput-tolerant. Using the communication technique described above, some of these services can be offered inline on the same chip (such as simple access control lists) or by an external device, such as a general purpose processor or network processor. Note that these services may be identified by a link-layer and a network-layer lookup of packets that result in a different virtual switch-port number where the services are enabled. Furthermore, additional services may be enabled for each physical port.

Thus, the classification framework that results in each of these services may be based on a combination of link-layer, network-layer and/or transport-layer headers. In the context of an InfiniBand network, the lookup may be performed based on a combination of the local identifier (LID), service level (SL), virtual lane, and/or other fields in the global routing header. Alternatively, in the context of an Ethernet network, the lookup may be performed based on link-layer information (such as the media access control, virtual local area network, Ethertype, etc.) and/or network-layer/transport-layer information (such as an Internet Protocol, type-of-service field, etc.).

Figure 3:
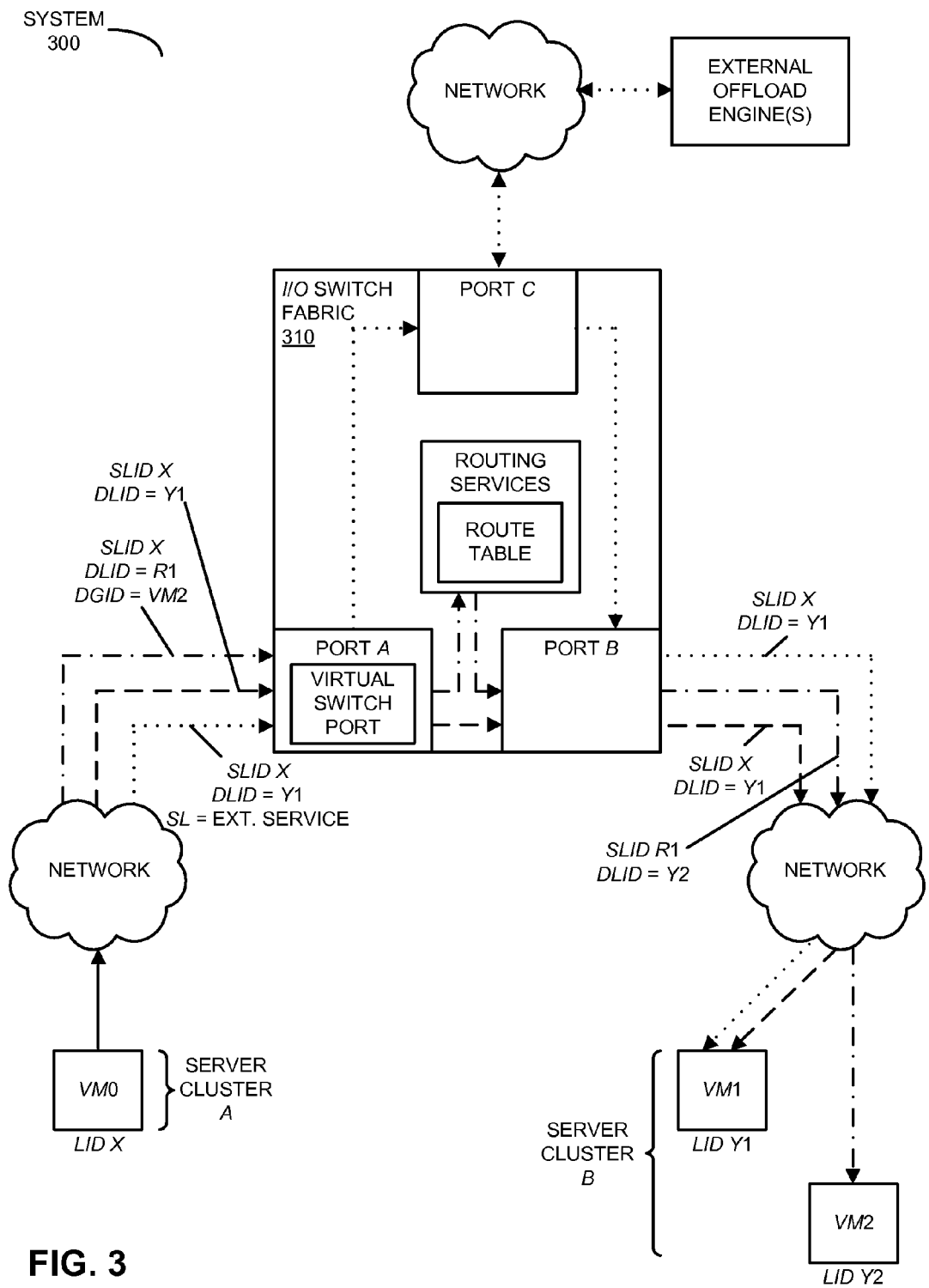
FIG. 3 is a block diagram illustrating a system that includes an I/O switch fabric in accordance with an embodiment of the present disclosure.

An illustration of how different network streams in an aggregated network are handled in the communication technique is shown in FIG. 3. In particular, port A and port B are physical ports on the I/O switch fabric coupled to a cluster of servers/VMs by one or more networks. These physical ports may receive aggregated traffic that is piped in and out from server clusters A and B, which can be sources and/or destinations of the packets. (Note that there may be one or more servers within each cluster.) Moreover, the physical ports may convey multiple network streams of traffic or flows per physical port.

In FIG. 3, between VM0 and VM1, there may be two types of network-packet streams or network flows: low-latency network streams (such as a switching service, which may be low latency and high throughput), indicated by the dashed line; and network-packet streams that require external offloads (e.g., a secure-socket layer or firewall offload) indicated by the dotted line. (Packets that require external offloads may be associated with a complex service, such as encryption, so they are sent to an external processor or service for further processing. The associated network streams may be low throughput and may have high latency.) Similarly, VM2 may be on a different network subnet than VM0, in which case the traffic follows a path for routing packets, which is indicated by the dashed and dotted line. (In general, the routed packets may have longer lengths, and the associated network streams may be high throughput and high latency.) Note that the communication in system 300 may involve next-hop calculation and replacement of headers.

Instances of a classifier, such as the hierarchical classifier in FIG. 2, are used to segment packets for network-packet streams or network flows with different types of service, and parallel pipelines are used to convey the segmented packets to different virtual switch ports so the different network flows do not interfere with each other. This allows flow affinity to be maintained in system 300. Therefore, a given physical port can concurrently provide different types of service for different network flows. For example, the packets may be received from different physical sources and different physical destinations, the same physical sources and the same physical destinations, and/or combinations thereof.

Figure 4:
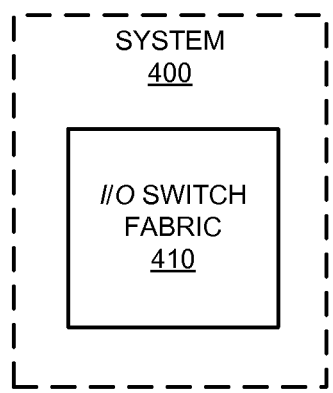
FIG. 4 is a block diagram illustrating a system that includes the I/O switch fabric of FIG. 1 or 3 in accordance with an embodiment of the present disclosure.

I/O switch fabric 100 (FIG. 1) and/or hierarchical classifier 200 (FIG. 2) may be included in a variety of systems, such as system 300 and, more generally, system 400 shown in FIG. 4 (which includes I/O switch fabric 410). In general, functions of the I/O switch fabric, the hierarchical classifier and the system may be implemented in hardware and/or in software. Thus, the I/O switch fabric and/or the system may include one or more program modules or sets of instructions stored in an optional memory subsystem (such as DRAM or another type of volatile or non-volatile computer-readable memory), which may be executed by an optional processing subsystem. Note that the one or more computer programs may constitute a computer-program mechanism. Furthermore, instructions in the various modules in the optional memory subsystem may be implemented in: a high-level procedural language, an object-oriented programming language, and/or in an assembly or machine language. The programming language may be compiled or interpreted, e.g., configurable or configured, to be executed by the processing subsystem.

Components in the I/O switch fabric and/or the system may be coupled by signal lines, links or buses. These connections may include electrical, optical, or electro-optical communication of signals and/or data. Furthermore, in the preceding embodiments, some components are shown directly connected to one another, while others are shown connected via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, the system may be at one location or may be distributed over multiple, geographically dispersed locations.

In the communication technique, packets may be received via a network, such as: the Internet, World Wide Web (WWW), an intranet, a cellular-telephone network, LAN, WAN, MAN, Ethernet, InfiniBand, or a combination of networks, or other technology enabling communication between computing systems.

Note that the system may include: a VLSI circuit, a switch, a hub, a bridge, a router, a communication system (such as a WDM communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device. Moreover, a given computer system may be at one location or may be distributed over multiple, geographically dispersed locations.

Furthermore, the embodiments of the I/O switch fabric, the hierarchical classifier and/or the system may include fewer components or additional components. For example, there may be fewer or more classification engines and/or classification stages in classifiers 114 (FIG. 1) and/or hierarchical classifier 200 (FIG. 2). Although these embodiments are illustrated as having a number of discrete items, the I/O switch fabric, the hierarchical classifier and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the I/O switch fabric, the hierarchical classifier and/or the system may be implemented more in hardware and less in software, or less in hardware and more in software, as is known in the art.

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on a computer-readable medium. Those of skill in the art of integrated circuit fabrication can use such encoded data to fabricate integrated circuits comprising one or more of the circuits described herein.

Figure 5:
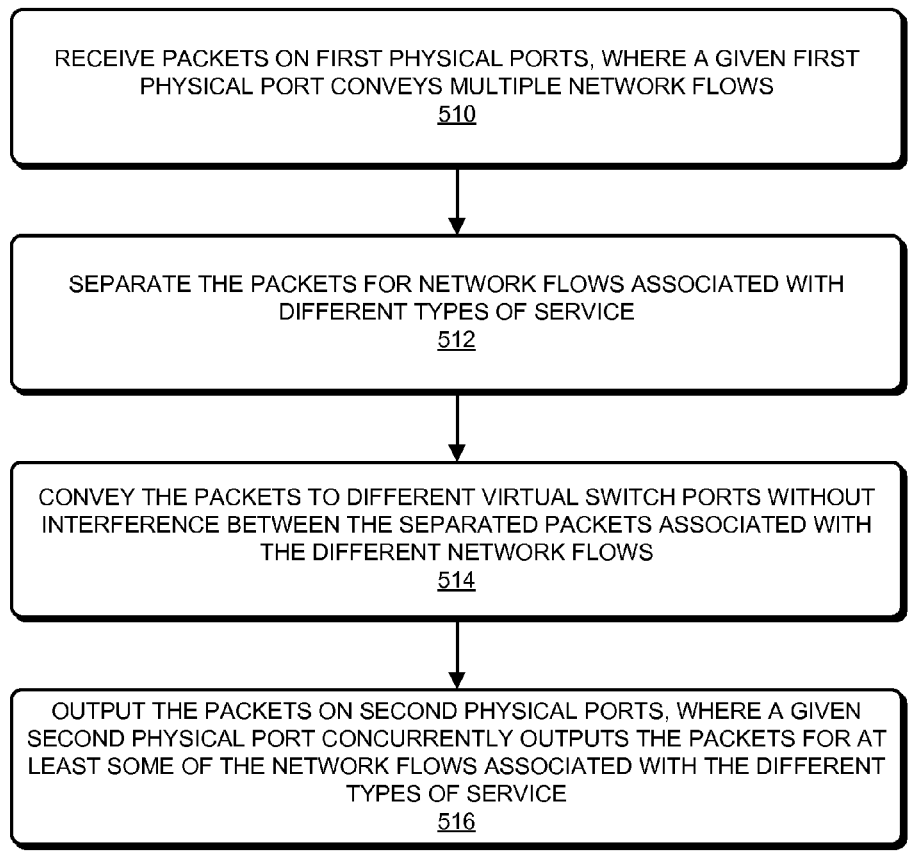
FIG. 5 is a flow chart illustrating a method for providing packets in accordance with an embodiment of the present disclosure.

We now describe the method. FIG. 5 presents a flow chart illustrating a method 500 for providing packets, which may be performed by an I/O switch fabric (such as I/O switch fabric 100 in FIG. 1). During this method, the I/O switch fabric receives the packets on first physical ports, where a given first physical port conveys multiple network flows (operation 510). Then, the packets are separated for network flows associated with different types of service (operation 512). Moreover, the packets are conveyed to different virtual switch ports without interference between the separated packets associated with different network flows (operation 514). Next, the packets are output on second physical ports, where a given second physical port concurrently outputs the packets for at least some of the network flows associated with the different types of service (operation 516).

In some embodiments of method 500, there are additional or fewer operations. For example, a decision point in the I/O switch fabric may offload at least some of the packets associated with one of the network flows for processing via one of the second physical ports. After the processing, these packets may come back to the same second physical port. Moreover, the order of the operations may be changed, and/or two or more operations may be combined into a single operation.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An input/output (I/O) switch fabric, comprising:
   first physical ports, wherein a given first physical port is configured to convey multiple network flows;
   classifiers, coupled to the first physical ports, configured to separate packets for network flows associated with different types of service and to convey the packets to different virtual switch ports without interference between the separated packets associated with the different network flows;
   the virtual switch ports coupled to the classifiers, wherein the virtual switch ports support different types of service and a given virtual switch port supports a given type of service to facilitate splitting and recombining of the different network flows; and
   second physical ports coupled to the virtual switch ports, wherein a given second physical port is configured to concurrently output packets for at least some of the network flows associated with the different types of service.

2. The I/O switch fabric of claim 1, wherein the I/O switch fabric is configured to offload at least a subset of the packets for processing via a given second physical port; and
   wherein at least the subset of packets returns to the given second physical port after the processing.

3. The I/O switch fabric of claim 1, wherein the packets provided by the given second physical port have a same source and a same destination.

4. The I/O switch fabric of claim 1, wherein the packets provided by the given second physical port have different sources and a same destination.

5. The I/O switch fabric of claim 1, wherein the packets provided by the given second physical port have a same source and different destinations.

6. The I/O switch fabric of claim 1, wherein at least one of the network flows is associated with a switching service.

7. The I/O switch fabric of claim 1, wherein at least one of the network flows is associated with a routing service.

8. A system, comprising an input/output (I/O) switch fabric, wherein the I/O switch fabric includes:
   first physical ports, wherein a given first physical port is configured to convey multiple network flows;
   classifiers, coupled to the first physical ports, configured to separate packets for network flows associated with different types of service and to convey the packets to different virtual switch ports without interference between the separated packets associated with the different network flows; and
   the virtual switch ports coupled to the classifiers, wherein the virtual switch ports support different types of service and a given virtual switch port supports a given type of service to facilitate splitting and recombining of the different network flows; and
   second physical ports coupled to the virtual switch ports, wherein a given second physical port is configured to concurrently output packets for at least some of the network flows associated with the different types of service.

9. The system of claim 8, wherein the I/O switch fabric is configured to offload at least a subset of the packets for processing via a given second physical port; and
   wherein at least the subset of packets returns to the given second physical port after the processing.

10. The system of claim 8, wherein the packets provided by the given second physical port have a same source and a same destination.

11. The system of claim 8, wherein the packets provided by the given second physical port have different sources and a same destination.

12. The system of claim 8, wherein the packets provided by the given second physical port have a same source and different destinations.

13. The system of claim 8, wherein at least one of the network flows is associated with a switching service.

14. The system of claim 8, wherein at least one of the network flows is associated with a routing service.

15. A method for providing packets, wherein the method comprises:
   using an input/output (I/O) switch fabric, receiving the packets on first physical ports, wherein a given first physical port conveys multiple network flows;
   separating the packets for network flows associated with different types of service;
   conveying the packets to different virtual switch ports without interference between the separated packets associated with the different network flows, wherein the virtual switch ports support different types of service and a given virtual switch port supports a given type of service to facilitate splitting and recombining of the different network flows; and
   outputting the packets on second physical ports, wherein a given second physical port concurrently outputs packets for at least some of the network flows associated with the different types of service.

16. The method of claim 15, wherein the method further comprises:
   offloading at least a subset of the packets for processing via a given second physical port; and
   returning at least the subset of packets to the given second physical port after the processing.

17. The method of claim 15, wherein the packets provided by the given second physical port have a same source and a same destination.

18. The method of claim 15, wherein the packets provided by the given second physical port have different sources and a same destination.

19. The method of claim 15, wherein the packets provided by the given second physical port have a same source and different destinations.

20. The method of claim 15, wherein at least one of the network flows is associated with one of: a switching service and a routing service.

* * * * *